Re. 24556

May 28, 1957  P. ECKMAN  2,793,850
WEIGHING DEVICE
Filed Oct. 26, 1953  2 Sheets-Sheet 1

Inventor
PETE ECKMAN
By Bair, Freeman & Molinare
Attorneys

May 28, 1957 P. ECKMAN 2,793,850
WEIGHING DEVICE
Filed Oct. 26, 1953 2 Sheets-Sheet 2

Inventor
PETE ECKMAN
By Bair, Freeman & Molinare
Attorneys

United States Patent Office 2,793,850
Patented May 28, 1957

2,793,850

WEIGHING DEVICE

Pete Eckman, Arnolds Park, Iowa

Application October 26, 1953, Serial No. 388,115

7 Claims. (Cl. 265—47)

This invention relates to a weighing device wherein I use a hydraulic system as a means of transmitting the weight of a load to a pressure gauge that may be graduated in weight units.

One object of the invention is to provide a weighing device of the general character disclosed wherein one or more pressure units may be used to support the load, each pressure unit comprising a closed chamber having a diaphragm therein and filled with fluid on one side of the diaphragm, the several fluid filled chambers being connected together in a hydraulic system that terminates at a pressure gauge for indicating on the dial of the gauge any load that is applied to the pressure units.

Another object is to provide a weighing device of the hydraulic type wherein there is an air space which may be varied by pumping air into the same or releasing air therefrom and thus correcting the position of the needle on the gauge dial if it shifts from the zero position because of expansion or contraction of the fluid as a result of atmospheric temperature changes and the like.

A further object is to provide a hydraulic system that can be used for platform scales, pit scales, vehicle scales and the like, or can be used in relatively small installations such as for a bathroom scale.

Still a further object is to provide a novel type of pressure unit having means therein to limit the movement of the diaphragm under either excessive load or excessive internal pressure of the hydraulic system, and thereby to prevent the same from rupturing.

An additional object is to provide a hydraulic weighing system wherein a pressure unit of comparatively simple yet rugged construction is provided and a number of these can be used to build up a weighing device of any desired capacity which is comparatively inexpensive yet accurate in indicating the weight imposed on the weighing system.

Another additional object is to provide a pressure unit having a diaphragm therein to form a pressure chamber on one side thereof, a diaphragm actuator in the form of a ball and a short shaft being provided on the opposite side of the diaphragm and the unit being adapted for interposition between a support and a load whereby the variation in load varies the pressure in the pressure chamber and these variations in pressure affect a pressure gauge to indicate the magnitude of the load thereon.

A further additional object is to provide a plate against which the ball engages to properly transmit the load and to prevent side stresses that would render the weight indications inaccurate.

With these and other objects in view, my invention consists in the construction, arrangement and combination of the various parts of my weighing device whereby the objects contemplated are obtained as hereinafter more fully set forth, pointed out in my claims and illustrated in the accompanying drawings wherein:

Figure 1:
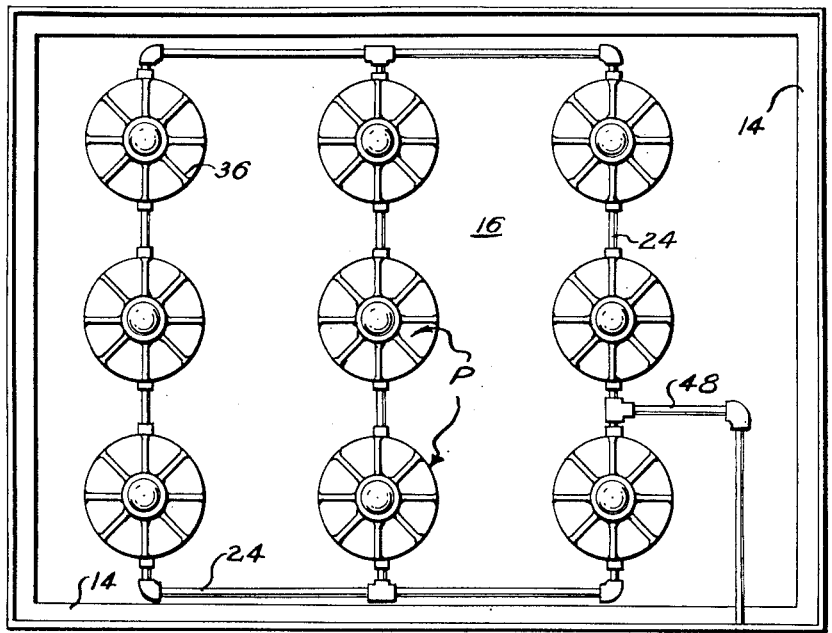
Fig. 1 is a bottom plan view of a weighing platform and a plurality of my pressure units mounted thereon.

On the accompanying drawing I have used the reference numeral 10 to indicate a concrete foundation in which there is a pit 12. In the pit is a frame 14 on which is a platform 16. The platform 16 has a plurality of pressure units P secured thereto which will now be described.

Each pressure unit P comprises a base 18 secured to the platform 16 as by bolts 20. An annular channel 22 is provided in the base 18 and the channels of the various units are connected together by piping 24.

On the lower face of each base 18 is a gasket 26 and against this face is a diaphragm 28 of sheet metal or any other suitable material, either metallic or otherwise. The diaphragm may be flat or corrugated as illustrated. Against the diaphragm a cover plate 30 is secured by screws 32. The plate 30 has a hub 34 and is reinforced by a number of ribs 36. In the hub 34 is slidably mounted a short section of shaft 38 and a hardened ball 40 of steel or the like. For each ball 40 I provide a supporting plate 42 located in the bottom of the pit 12 and this is preferably also made of steel.

Figure 6:
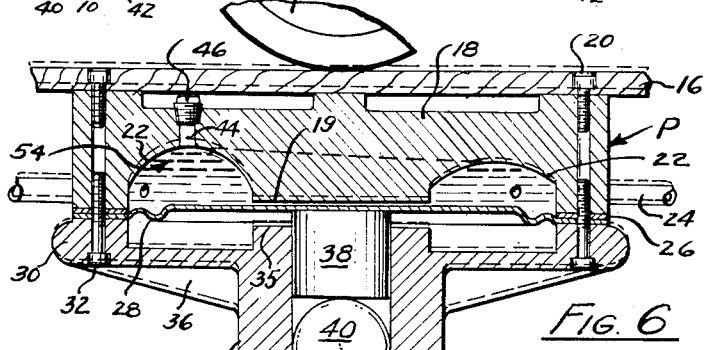
Fig. 6 is a further enlarged sectional view thereof showing in dotted lines the normal position of the parts and in solid lines the position under load.

The piping 24 and the annular channels 22 of the pressure units P constitute a hydraulic system and each of the pressure units is provided with a vent opening 44 normally closed by a plug 46 as shown in Fig. 6. It will also be noted that the channel 22 is high at the left side and low at the right side and that the vent opening 44 is located at the high point of the channel. This is to permit the escape of air when filling the system with oil, and the plug 46 may then be inserted to seal the system.

Figure 7:
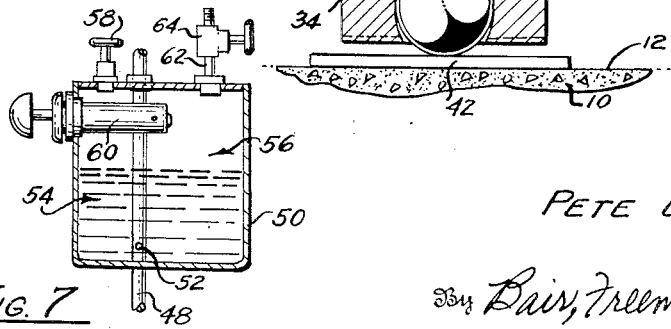
Fig. 7 is a sectional view of the hydraulic reservoir shown in Fig. 2.

From the hydraulic system a pipe 48 leads to a reservoir 50, the details of which are shown in Fig. 7. The pipe 48 communicates with the interior of the reservoir through an opening 52 which is continuously submerged in the fluid 54 in the reservoir. An air space 56 is provided above the fluid and a bleeder valve 58 is associated therewith for bleeding air therefrom when the system is initially filled with oil.

Also, a hand-operated air pump 60 may be provided for supplying air to the air space 56 under certain other conditions. In addition to the hand pump, a suitable compressed air supply may be provided for supplying air through a pipe 62 under the control of a valve 64. The arrangement shown can thus utilize such compressed air supply, but in case it fails, the hand pump 60 can be used. The piping 48 terminates in a pressure gauge 49 which may advantageously be graduated in pounds. A valve 51 may be provided just ahead of it if desired.

Figure 3:
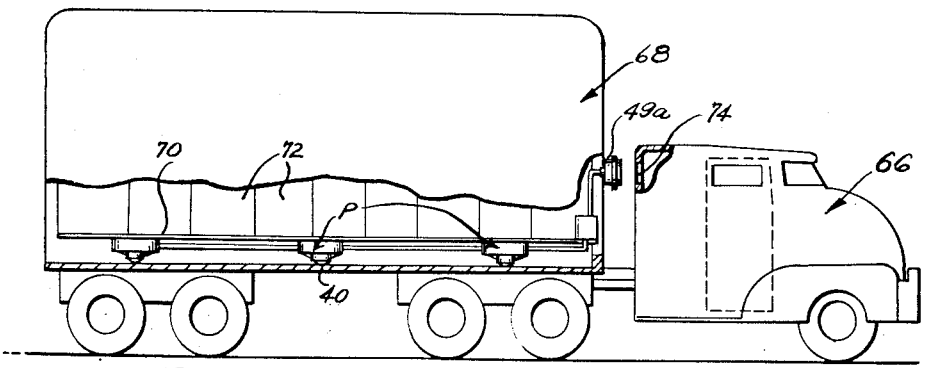
Fig. 3 is a side elevation of a tractor and a semi-trailer with a portion of the trailer body broken away and showing one of my weighing devices installed thereon for weighing the load therein.

In Fig. 3 I show how my weighing device can be applied to a semi-trailer, a tractor being shown at 66 and the trailer at 68. The body of the trailer has a plurality of the pressure units P located therein with their balls 40 resting on the floor of the trailer and they are provided with a platform 70 to support the load such as the cartons indicated at 72.

The pressure gauge for the pressure units P is shown at 49a which in this case is located on the front of the trailer body 68 and may be seen through the rear window 74 of the tractor cab. Such an arrangement permits determination at any time of the weight of the load in the trailer and is a great help in preventing its overloading thereof.

Figure 8:
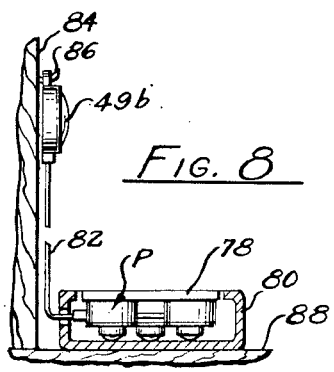
Fig. 8 is a side elevation partly in section showing my pressure units applied to a bathroom scale.

In Fig. 8 I show a further modification wherein three small pressure units P are used in a bathroom scale. The platform is shown at 78 and a suitable housing 80 may be provided for the pressure units.

The hydraulic system in the bathroom scale includes a gauge 49b and a flexible conduit 82 for connecting the pressure units to the gauge 49b. The gauge may be supported on a wall 84 at eye level for convenience in reading the weight as by means of a hook 86 and the scale housing 80 sits on the floor 88 adjacent the wall in an obvious manner.

*Practical operation*

Figure 2:
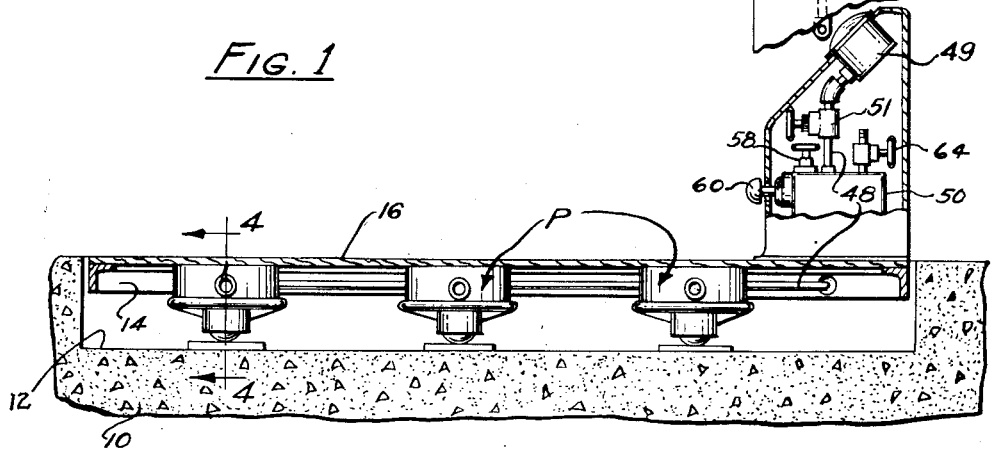
Fig. 2 is a side elevation thereof showing the platform and the pressure units mounted in a pit and showing a gauge unit and the necessary accessory apparatus for providing a weighing device of the kind I contemplate.

Referring to Fig. 6, normal operation of the pressure units of Figs. 1 and 2 is illustrated. When there is no load on the platform 16 the parts will be in the position shown by dotted lines, with the diaphragm 28 floating between stop bosses 19 and 35 of the base 18 and the cover plate 30. Then when a load is applied, such as a truck or the like, one tire of which is indicated at 37, the platform 16 and the base 18 will be depressed as to the full line position and the hydraulic fluid 54 will be displaced into the reservoir 50 and compress the air space 56 therein. At the same time the pressure will be transmitted to the Bourdon tube of the pressure gauge 49 and give a reading of the weight of the load on the platform 16.

Figure 4:
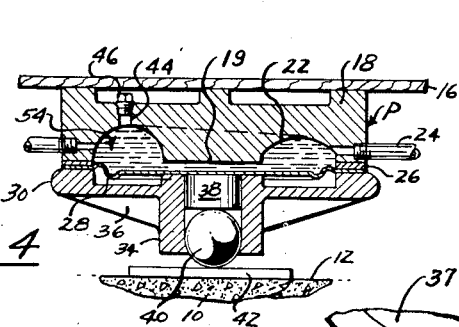
Fig. 4 is a vertical sectional view on the line 4—4 of Fig. 2 showing the operation of one of the pressure units under excessive oil pressure.

Referring to Fig. 4, if there is excessive hydraulic pressure in the system the diaphragm 28 will be driven down against the stop boss 35 as shown and the gauge 49 will show a pressure above zero whereupon it is necessary to bleed out some of the air at 58 (Fig. 7) so that the gauge can be properly zeroized.

Figure 5:
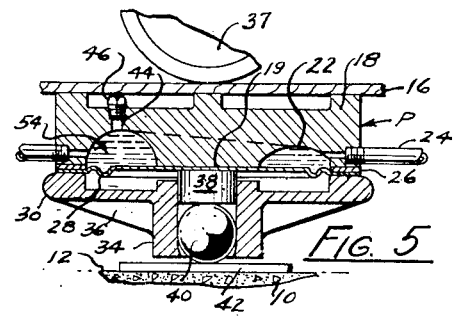
Fig. 5 is a similar sectional view showing its operation under excessive load.

Referring to Fig. 5, in the case of an excessive load condition, the diaphragm 28 will be stopped against the stop boss 19 rather than stretched beyond its elastic limit and thereby damaged.

From the foregoing specification it will be obvious that I have provided a pressure unit which accurately measures pressures and, by means of a pressure gauge hydraulically connected thereto, indicates the weight of a load applied to the units. The units may be made of cast iron, cast steel, or built up of steel plate welded together if desired. They can be made in any practical size and shape and of any required strength.

A plurality of the units placed under a platform are suitable for weighing trucks or the loads carried thereby, or for weighing livestock, grain, produce, gravel, rock, dirt or any commodity that may be placed on the platform. The pressure units are adaptable for both stationary and portable weighing and offer a fast and accurate means for balancing loads carried in airplanes and balancing the axle weight loads of trucks and semi-trailers.

The combination of ball bearings 40 and supporting plates 42 prevents any side stresses on the pressure units and eliminates any possibility of bind or friction. The platform 16 may be limited by linkage or the like (not shown) so as to stay within the confines of the pit 12 and the balls 40 may roll on the plates 42 for permitting the free positioning of the platform as dictated by such linkage.

The combination of base 18 and cover plate 30 with the shaft 38 and the ball 40 located at the center of the hub 34 insures perfect distribution of the weight of the load to the center of each diaphragm 28. The fluid 54 may be a lubricant to further eliminate friction and of permanent type to protect the unit. The space in the cover plate 30 and the boss 34 may also be packed with lubricant to aid in this respect.

The design of the unit is such as to withstand great external strain without change of shape or capacity of fluid and likewise to withstand great internal pressure without bulging or changing shape or fluid capacity.

When the diaphragm 28 is made of comparatively thin sheet metal it will allow all outside weight or pressure to be applied to the fluid inside the system without loss by friction or tension of the metal. It may be of any desirable thickness for the load expected to be carried.

The base plate 18 and the cover plate 30 are machined smooth to guarantee a good fit which is fluid-tight with respect to the gasket 26 and the diaphragm 28. The space between the bosses 19 and 35 is relatively small so as to insure that the diaphragm will not be stressed beyond its elastic limit and thereby damaged either under excessive oil pressure or excessive load.

Some changes may be made in the construction and arrangement of the parts of my weighing device without departing from the real spirit and purpose of my invention, and it is my intention to cover by my claims any modified forms of structure or use of mechanical improvements which may be reasonably included within their scope.

I claim as my invention:

1. In a weighing device, a plurality of pressure chambers, each one being closed by a diaphragm, a load supporting platform, means for transmitting the load thereof to the central portion of the diaphragm of each pressure chamber, a hydraulic system connecting said pressure chambers together, a pressure gauge responsive to the pressure in said hydraulic system to thereby indicate the magnitude of the load on said platform, each of said pressure chambers having means therein for limiting both the downward and upward flexing of said diaphragm due to either an excessive load or excessive internal pressure, said means comprising bosses on opposite sides of the central portion only of said diaphragm, and means for distributing the load of the diaphragm comprising a shaft slidable in one of said bosses, a ball engaging said shaft and also slidable in the boss and a supporting plate having a surface of substantial area for contact with said ball.

2. In a hydraulic weighing device, a plurality of pressure units, each comprising a base and a cover plate therefor, and a diaphragm between said base and cover plate dividing the upper portion of said pressure unit into a pressure chamber, a load supporting platform, said bases being secured thereto so that said platform is supported thereon, said cover plates each having a hub provided with a bore, a shaft slidable in each of said hubs and engageable with each of said diaphragms, a ball in each of said bores against the outer end of said shaft, a supporting structure, a plate thereon for supporting each of said balls and permitting rolling of the ball thereon, a hydraulic system connecting said pressure units together, said pressure units and system containing a hydraulic fluid, and a pressure gauge responding to the pressure in said system to indicate the magnitude of a load on said platform.

3. In a weighing device of the character disclosed, a plurality of pressure units, each comprising a base having an annular groove therein, a stop boss within said annular groove, said annular groove being progressively deeper from one side to the other of said base, a vent plug at its deepest point, a cover plate for said base, a diaphragm between said base and cover plate, said cover plate having a hub provided with a bore, and a shaft slidable therein and engageable with the center of said diaphragm, the inner end of said hub constituting a stop for said diaphragm spaced from said stop boss of said base a distance somewhat greater than the thickness of said diaphragm, a load supporting platform, a supporting plate, said pressure unit being interposed between said platform and said plate, said platform being supported thereby, a hydraulic system connecting said pressure units together, said pressure units and system containing a hydraulic fluid, and a pressure gauge responsive to the pressure in said hydraulic system to thereby indicate the magnitude of a load on said platform, said stop bosses and stops limiting both the upward and downward movement of said diaphragms when the load is excessive or when under the action of excessive pressure of fluid in said hydraulic system.

4. In a hydraulic weighing device, a plurality of pressure units, each comprising a base casting and a cover casting, and a diaphragm between said castings, each of said base castings having an annular cavity therein forming a pressure chamber, the portion of said base casting within said annular cavity constituting a stop boss, each of said cover castings having a central projection also serving as a stop boss for said diaphragm, said stop boss of each of said cover castings having a bore, a shaft slidable in each of said bores and engageable with said diaphragms, a ball movable in each of said bores, projected outward therefrom and engageable with the outer ends of said shafts, a platform and a supporting plate, said pressure unit being interposed between the two, a hydraulic system connecting said pressure units together, said system containing a hydraulic fluid, and a pressure gauge responsive to the pressure in said system for indicating the load on said platform.

5. In a hydraulic weighing device, a plurality of pressure units, each comprising a base casting and a cover casting, and a diaphragm between said castings, said base casting having a cavity therein forming a pressure chamber, said cover casting having a central hub provided with a bore, a shaft slidably guided in each of said bores and engageable with said diaphragms, a ball movable longitudinally in each of said bores, projecting beyond the outer end thereof and engageable with the outer ends of said shafts, a platform and a supporting plate, said pressure units being interposed between the two and said balls being movable across one thereof, a hydraulic system connecting said cavities together, said system containing a hydraulic fluid, and a pressure gauge responsive to the pressure in said system for indicating the load on said platform.

6. In a weighing device of the hydraulic type, a plurality of pressure units, each comprising a base plate and a cover plate, and a diaphragm between said plates, each of said base plates having an annular fluid cavity therein and a central stop boss, said cavity being progressively deeper from one diametric point to an opposite diametric point, a vent plug at said last point, each of said cover plates having a central stop boss and a shaft slidable therein, a ball in each of said last bosses against said shafts, a supporting plate for each of said balls, a platform supported by said pressure units, a hydraulic system connecting said pressure units together, said units and system containing a hydraulic fluid, and a pressure gauge responsive to the pressure in said hydraulic system to thereby indicate the magnitude of a load on said platform.

7. In a weighing device of the hydraulic type, a plurality of pressure units, each comprising a base plate and a cover plate, and a diaphragm between said plates, each of said base plates having an annular fluid cavity therein and a central stop boss, said cavity having one portion of greater elevation than the rest of the cavity, a vent plug at said portion, each of said cover plates having a central stop boss and a shaft slidable therein, a ball in each of said bosses against said shafts, a platform supported by said pressure units, a supporting plate for each of said balls, a hydraulic system connecting said pressure units together, said pressure units and system containing a hydraulic fluid, and a pressure gauge responsive to the pressure in said hydraulic system to thereby indicate the magnitude of a load on said platform.

References Cited in the file of this patent

UNITED STATES PATENTS

| Number | Name | Date |
|---|---|---|
| 1,772,188 | Mason | Aug. 5, 1930 |
| 2,109,460 | Brasher | Mar. 1, 1938 |
| 2,314,011 | Maurer | Mar. 16, 1943 |
| 2,349,228 | Wolff | May 16, 1944 |
| 2,352,935 | Bohannan | July 4, 1944 |
| 2,452,124 | Huston | Oct. 26, 1948 |
| 2,561,321 | Tate | July 17, 1951 |
| 2,592,501 | Williams | Apr. 8, 1952 |
| 2,645,248 | Baker | July 14, 1953 |
| 2,652,241 | Williams | Sept. 15, 1953 |

FOREIGN PATENTS

| Number | Country | Date |
|---|---|---|
| 178,018 | Great Britain | Apr. 13, 1922 |
| 161,086 | Switzerland | June 16, 1933 |
| 32,943 | France | Dec. 29, 1937 |